United States Patent
Tung

(10) Patent No.: US 6,795,916 B2
(45) Date of Patent: Sep. 21, 2004

(54) METHOD FOR UPDATING MICROCODE IN A SYSTEM WHEREIN A KEYBOARD BIOS EXPECTS AN UPDATED SIGNAL WITHIN A TIME PERIOD AFTER MICROCODE UPDATE COMMENCES

(75) Inventor: Chung-Chih Tung, Taipei (TW)

(73) Assignee: Mitac International Corp., Hsinchu (TW)

(*) Notice: Subject to any disclaimer, the term of this patent is extended or adjusted under 35 U.S.C. 154(b) by 647 days.

(21) Appl. No.: 09/875,744

(22) Filed: Jun. 6, 2001

(65) Prior Publication Data

US 2002/0066009 A1 May 30, 2002

(30) Foreign Application Priority Data

Nov. 29, 2000 (TW) ........................ 89125294 A

(51) Int. Cl.$^7$ ................................. G06F 1/24
(52) U.S. Cl. .................. 713/2; 714/38; 714/55
(58) Field of Search .............. 713/2, 100; 714/38, 714/48

(56) References Cited

U.S. PATENT DOCUMENTS

| | | | | |
|---|---|---|---|---|
| 5,748,940 A | * | 5/1998 | Angelo et al. ............... | 711/163 |
| 5,949,997 A | * | 9/1999 | Smith ............................. | 713/2 |
| 6,651,188 B2 | * | 11/2003 | Harding et al. ............... | 714/38 |
| 6,715,074 B1 | * | 3/2004 | Chaiken ....................... | 713/164 |
| 6,715,106 B1 | * | 3/2004 | Mermelstein ................. | 714/36 |

FOREIGN PATENT DOCUMENTS

| | | | | |
|---|---|---|---|---|
| JP | 11149371 A | * | 6/1999 | ............. G06F/9/06 |

* cited by examiner

Primary Examiner—Thomas Lee
Assistant Examiner—Mark Connolly
(74) Attorney, Agent, or Firm—Darby & Darby

(57) ABSTRACT

A novel boot method for a system, whose system BIOS has been disabled by erroneous microcode input as the result of inadvertent miscoding or malicious intent. The keyboard BIOS of the system is utilized in the present invention. If the CPU of the computer crashes during a microcode update, the system notes the error (setting a number of flags) and restarts the computer. The restarted system will not perform the microcode update, but goes straight to the normal BIOS activation, avoiding the crash problem. To fix the problem, users need only request the correct microcode from CPU retailers to amend the errors in the BIOS.

7 Claims, 2 Drawing Sheets

METHOD FOR UPDATING MICROCODE IN A SYSTEM WHEREIN A KEYBOARD BIOS EXPECTS AN UPDATED SIGNAL WITHIN A TIME PERIOD AFTER MICROCODE UPDATE COMMENCES

BACKGROUND OF THE INVENTION

1. Field of the Invention

The present invention relates in general to a boot method for systems. In particular, the present invention relates to a boot method for a system whose system BIOS has been disabled by erroneous microcode input as the result of inadvertent miscoding or malicious intent.

2. Description of the Related Art

In the environment of the present-day microprocessor industry, life cycles of CPU products are dramatically shortened; CPU retailers, in order to react to short R&D cycles, publish CPU products first to reach the market, then update microcode to system manufacturers later. The microcode is rectified when posting BIOS systems to ensure the liability of the CPU products. Additionally, most CPU retailers require system manufacturers to provide an interface in the BIOS system, so after purchasing, users can enter the microcode provided by the CPU retailers into the BIOS system as needed. Thereby, each time the users start up, system BIOS updates the microcode to effect BIOS activation of the system, and posts the latest program edition into the system.

However, this method can easily be used by malicious parties as a way to damage systems. Although CPU retailers have adopted the checksum method to verify the microcode written in BIOS, the malicious parties can still fabricate the checksum codes or send virus messages to post the wrong microcode into the system, disabling the CPU.

SUMMARY OF THE INVENTION

An object of the present invention is to provide a novel boot method for a computer system. When a system BIOS code (or a microcode to be updated) in the system is damaged, the system is still able to complete BIOS activation procedure and perform the startup.

The keyboard BIOS is incorporated in the present invention. If the computer CPU crashes during the microcode update, the system records the event (setting a number of flags) and restarts the computer. The restarted system will not perform the update, but go straight to normal BIOS activation for the system, thus avoiding the crash problem. Users need only ask for the correct microcode from the CPU retailer to fix the errors in the BIOS.

To solve the described problems, the present invention provides a boot method for a system; the boot method allows the system to be rebooted in the event of erroneous microcode input; the boot method comprises the following steps: after activating the system, checks to determine the necessity for an update, and notification to the keyboard BIOS about the update; the keyboard BIOS waits for a first predetermined period after the update; if an updated signal is not received, the keyboard BIOS sets a fail flag, shuts down the system and, after a second predetermined period, reboots. If the fail flag has already been set during the previous boot, the system does not update the microcode after activation, and sets a non-update flag to allow the system to perform normal BIOS activation. If the non-update flag has already been set during the previous boot, the system starts the BIOS activation procedure after the computer is activated; otherwise, the system confirms whether the update should commence according to the fail flag settings.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

The general concept of the present invention is to set flags (fail flag and non-update flag) in the keyboard BIOS and CMOS of a system. The flags dictate whether an update can be safely performed.

Figure 1:
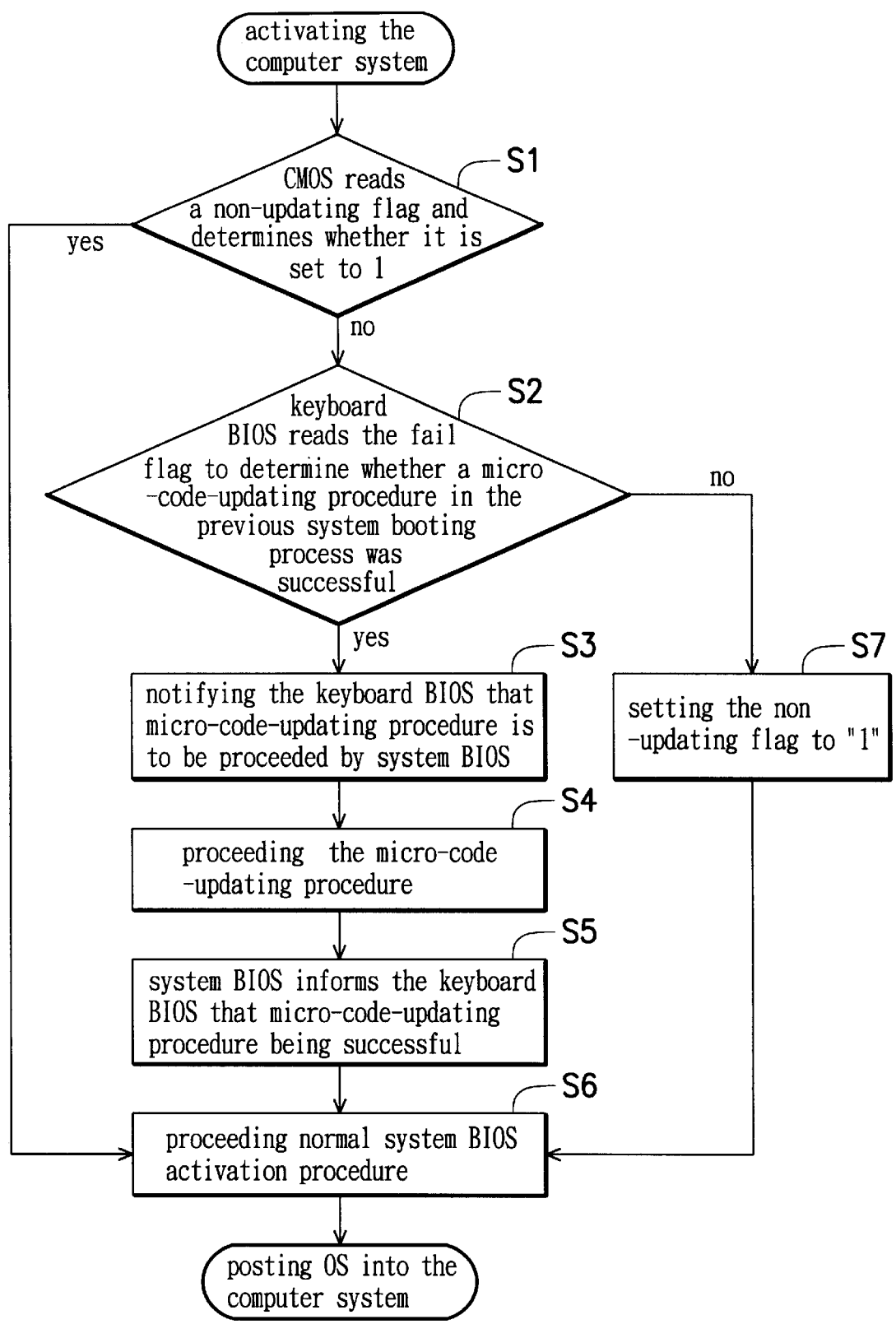
FIG. 1 is a flow chart diagram of the boot method of the present invention.

FIG. 1 is a flow chart diagram of the boot method of the present invention.

After the system is activated, referring to FIG. 1, CMOS reads a non-update flag and determines whether it has been set (S1), in the embodiment, the set value is "1". If the CMOS verifies the non-update flag's setting as "1", the system BIOS does not update the CPU microcode, goes straight to the normal activation procedure for the system BIOS (S6) and posts an operating system (OS).

If the CMOS verifies that the non-update flag is not set to "1", the keyboard BIOS reads the fail flag to verify whether the microcode update in the previous system boot was successful (S2). In the embodiment, if the microcode update in the previous system boot failed, the fail flag setting is set to "1";

IF the keyboard BIOS verifies that the previous microcode update failed, (the fail flag setting is "1), the system BIOS does not update the microcode, but sets the non-update flag to "1" (S7), performs the normal activation procedure for the system BIOS (S6), and posts an operating system (OS).

If the keyboard BIOS verifies that the previous update was successful (the fail flag is not set to "1"), the system BIOS sends a signal to notify the keyboard BIOS that the update will be performed (S3), and performs the update (S4). If the update is performed without any problems, the system BIOS informs the keyboard BIOS that the microcode update was successful (S5); the system BIOS then executes a normal activation (S6), and posts an OS.

Figure 2:
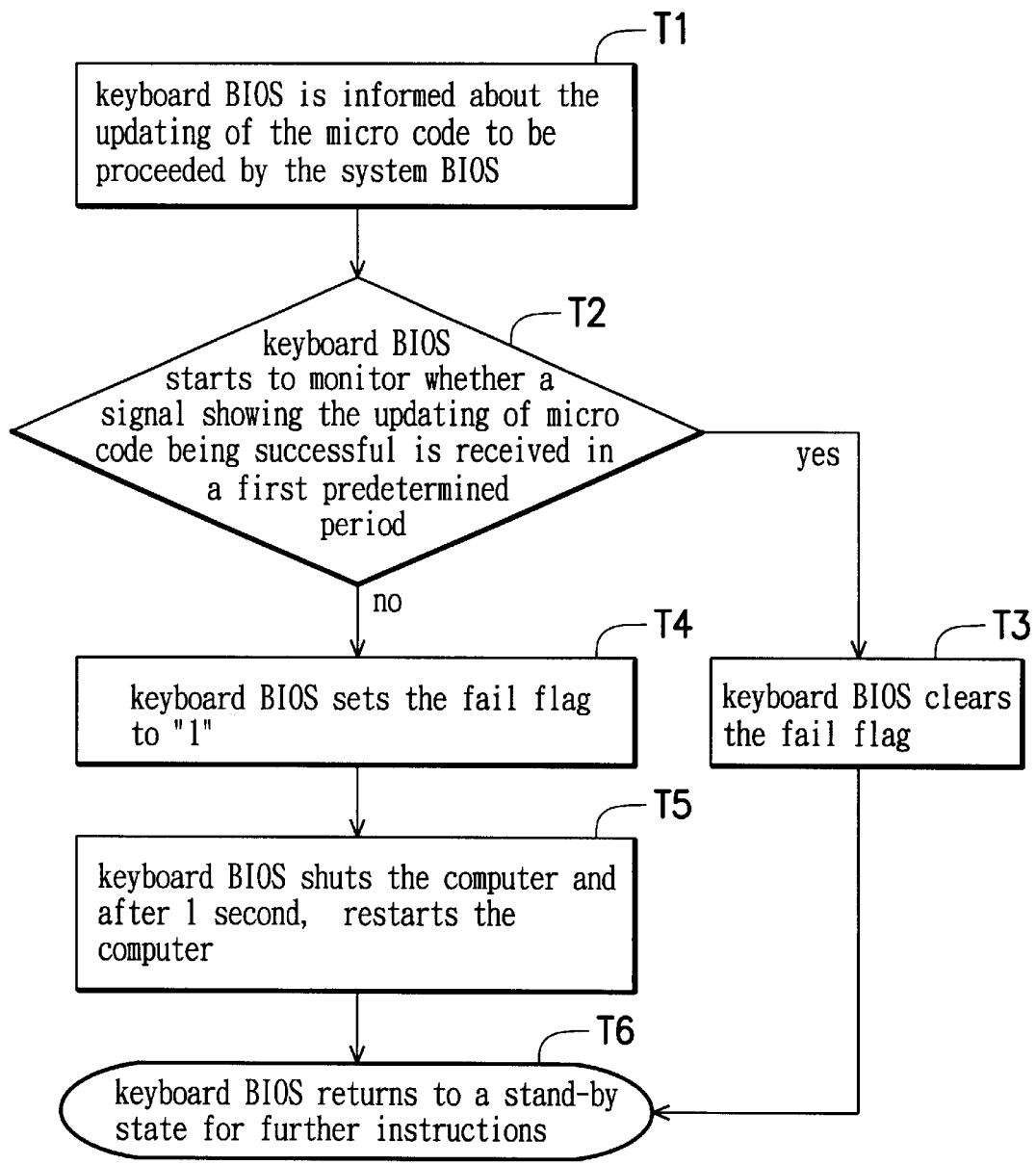
FIG. 2 shows the steps performed by the keyboard BIOS.

It is worth noting that once the keyboard BIOS receives notification of the pending update by the system BIOS, the keyboard BIOS begins to monitor the update, wherein the steps performed by the keyboard BIOS are shown in FIG. 2.

When the keyboard BIOS receives notification of the pending update (T1), the keyboard BIOS begins to monitor the update, and checks for indication of the update's success within a first predetermined period (T2).

If the keyboard BIOS receives the success signal within the first predetermined period, the keyboard BIOS clears the fail flag (T3); then the keyboard BIOS returns to a standby state for further instruction (T6).

If the keyboard BIOS does not receive the success signal within the first predetermined period, the keyboard BIOS sets the fail flag to "1" (T4), shuts down the computer and, after a second predetermined period of time, restarts the computer (T5); in the embodiment, the second predetermined period of time is 1 second. After the computer is restarted, the steps in FIG. 1 are repeated.

If the computer CPU crashes during the update, the system notes the crash, (setting the fail flag, and the non-update flag) and restarts the computer. The restarted system will not perform the microcode update, but goes straight to normal BIOS activation, avoiding the crash problem. The system is not paralyzed by a microcode update error and is still able to operate by referring to the original microcode; users need only request the correct microcode from the CPU retailer to fix the errors in the BIOS.

When the user has rewritten the correct microcode to the system BIOS and fixed the damaged system BIOS code, the system clears the non-update flag.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A boot method for a system; the boot method allows the system to be rebooted in the event that the system BIOS has been disabled by erroneous microcode input as the result of inadvertent miscoding or malicious intent; the boot method comprises the following steps:

after activation, the system checks if it is necessary to update the microcode and notifies the keyboard BIOS of the needed update;

the keyboard BIOS waits for a first predetermined period after the update of the microcode commences, if an updated signal is not received, the keyboard BIOS sets a fail flag, shuts down the system and, after a second predetermined period, reboots the system.

2. The method in claim 1, wherein, if the fail flag has already been set, the system does not update the microcode after restarting, and sets an non-update flag to allow the system to perform normal BIOS activation.

3. The method in claim 2, wherein if the non-update flag has already been set, the system starts the BIOS activation procedure after the computer is activated; otherwise, the system confirms whether the update should commence according to the fail flag settings.

4. The method in claim 2, wherein the system sets the non-update flag in the system CMOS.

5. The method in claim 2, wherein the system sets the fail flag in the keyboard BIOS.

6. The method in claim 2, wherein the non-update flag is cleared after the damaged system BIOS code is rewritten.

7. The method in claim 1, wherein if the keyboard BIOS receives the updated signal after the first predetermined period, the keyboard clears the fail flag to allow the system to complete the BIOS activation.

* * * * *